United States Patent
Lee et al.

(10) Patent No.: US 10,696,833 B2
(45) Date of Patent: *Jun. 30, 2020

(54) POLYMER COMPOSITION BASED ON POLYPROPYLENE/PROPYLENE COPOLYMER HAVING SEMI-HOMOGENEOUS PHASE

(71) Applicant: Huinnovation Co., Ltd., Seongnam-si, Gyeonggi-do (KR)

(72) Inventors: Dong Kwon Lee, Seongnam-si (KR); Moon Seok Lee, Sejong-si (KR); Yong Rae Cho, Daejeon (KR)

(73) Assignee: HUINNOVATION CO., LTD., Seongnam-si (KR)

( * ) Notice: Subject to any disclaimer, the term of this patent is extended or adjusted under 35 U.S.C. 154(b) by 113 days.

This patent is subject to a terminal disclaimer.

(21) Appl. No.: 16/123,814

(22) Filed: Sep. 6, 2018

(65) Prior Publication Data

US 2019/0185648 A1 Jun. 20, 2019

(30) Foreign Application Priority Data

Dec. 19, 2017 (KR) ........................ 10-2017-0174787

(51) Int. Cl.
| | | |
|---|---|---|
| *C08L 23/12* | (2006.01) | |
| *C08L 23/14* | (2006.01) | |
| *C08K 5/09* | (2006.01) | |
| *C08K 5/5419* | (2006.01) | |
| *C08F 210/16* | (2006.01) | |
| *C08K 3/016* | (2018.01) | |
| *C08F 210/06* | (2006.01) | |

(52) U.S. Cl.
CPC .......... *C08L 23/142* (2013.01); *C08F 210/06* (2013.01); *C08F 210/16* (2013.01); *C08K 3/016* (2018.01); *C08K 5/09* (2013.01); *C08K 5/5419* (2013.01); *C08L 23/12* (2013.01); *C08F 2800/20* (2013.01); *C08L 2201/02* (2013.01); *C08L 2207/02* (2013.01)

(58) Field of Classification Search
CPC ........ C08L 23/142; C08L 23/12; C08L 12/16; C08L 2201/02; C08L 2207/02; C08L 2205/22; C08L 2203/202; C08L 2205/02; C08K 5/09; C08K 5/5419; C08K 3/016; C08F 210/16; C08F 210/06; C08F 2800/20; H01B 3/307; H01B 3/441
See application file for complete search history.

(56) References Cited

U.S. PATENT DOCUMENTS

| | | | |
|---|---|---|---|
| 5,074,771 A * | 12/1991 | Thakrar et al. ..... | B29C 45/1635 264/255 |
| 2008/0081869 A1* | 4/2008 | Kerstetter et al. ...... | C08L 21/00 524/502 |
| 2009/0211782 A1 | 8/2009 | Perego et al. | |
| 2012/0305123 A1* | 12/2012 | Kourogi et al. ........ | C08L 23/14 138/177 |
| 2013/0025909 A1 | 1/2013 | Perego et al. | |
| 2017/0349738 A1* | 12/2017 | Chiba et al. ................ | C08J 3/22 |
| 2019/0185651 A1* | 6/2019 | Lee et al. ................ | C08L 23/16 |

FOREIGN PATENT DOCUMENTS

| KR | 10-2014-0134836 A | 11/2014 |
|---|---|---|
| WO | WO 2007/118659 A1 | 10/2007 |
| WO | WO 2010/059425 A1 | 5/2010 |

* cited by examiner

*Primary Examiner* — Nathan M Nutter
(74) *Attorney, Agent, or Firm* — Birch, Stewart, Kolasch & Birch, LLP

(57) ABSTRACT

Disclosed is a polymer composition having a semi-homogeneous phase that exhibits excellent electrical, mechanical and thermal properties while satisfying flexibility, bendability and impact resistance. More specifically, disclosed is a polymer composition having a morphology in which a rubber-phase filler of a propylene copolymer is dispersed in a matrix of polypropylene, wherein an elution rate of the rubber-phase filler in a xylene-based solvent is less than 50%, based on the content of the rubber-phase filler such that the rubber-phase filler forms a semi-homogeneous phase with the matrix.

7 Claims, 4 Drawing Sheets

[FIG. 1]
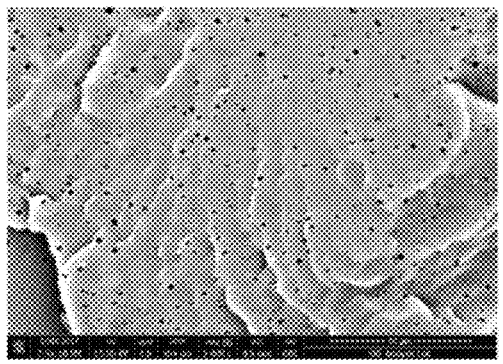
[FIG. 2]
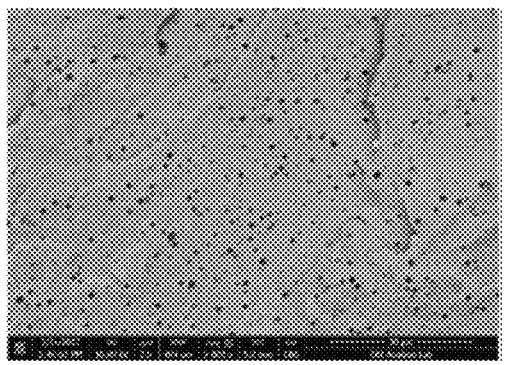
[FIG. 3]
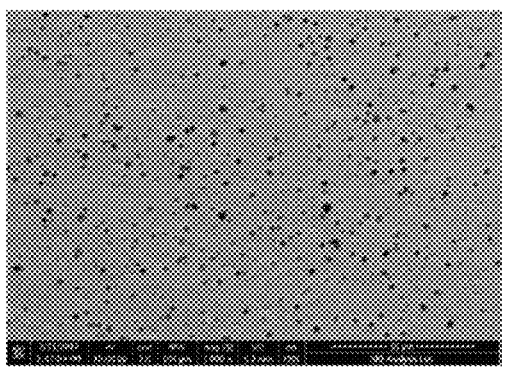

[FIG. 4]
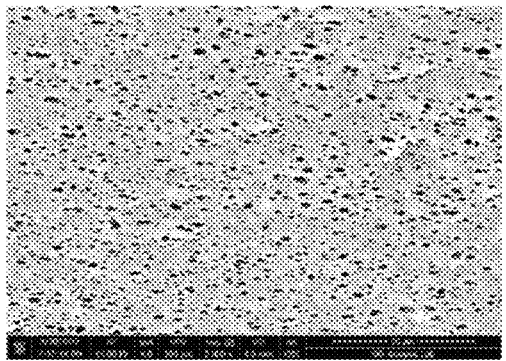
[FIG. 5]
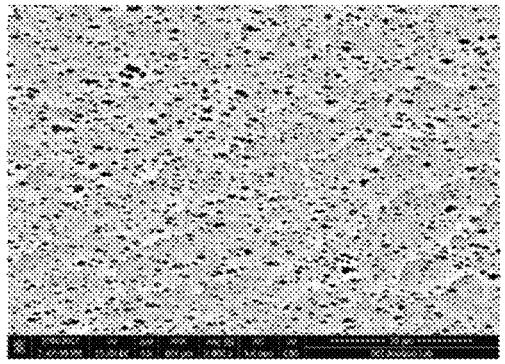
[FIG. 6]
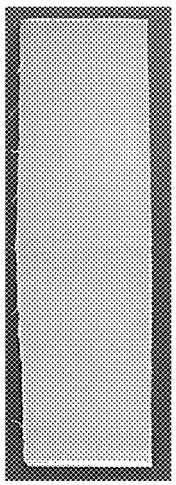

[FIG. 7]
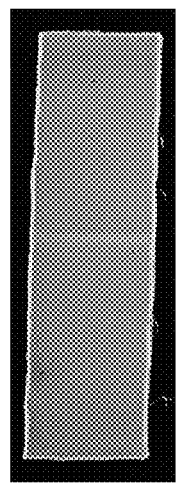
[FIG. 8]
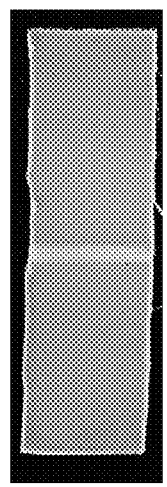

[FIG. 9]
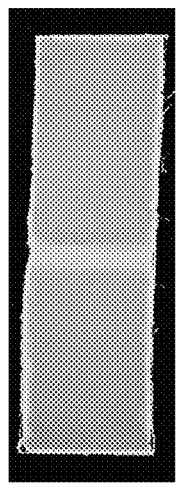
[FIG. 10]
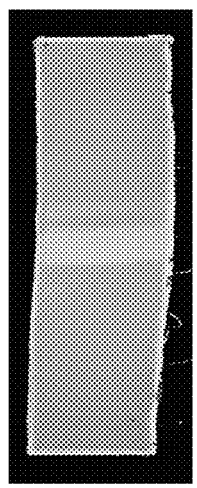

POLYMER COMPOSITION BASED ON POLYPROPYLENE/PROPYLENE COPOLYMER HAVING SEMI-HOMOGENEOUS PHASE

TECHNICAL FIELD

The present invention relates to a polymer composition having a semi-homogeneous phase that can exhibit electric, mechanical and thermal properties required for electrical insulation materials, flame retardant materials and the like, and owing to a new morphology, can maintain flexibility, bendability and the like, considerably suppress a whitening phenomenon upon application of external force, increase the addition amount of an inorganic substance such as a flame retardant agent and maintain mechanical and physical properties.

BACKGROUND ART

Polyethylene and polypropylene, which are representative polymers of polyolefin, are widely used in a variety of fields due to excellent physical properties and low prices. Polyethylene and polypropylene may be used in themselves in material fields requiring inherent physical properties or may be used in modified or combined forms suitable for characteristics of fields applied. Among them, polypropylene also has an extended application as a substitute for polyethylene due to excellent mechanical properties and relatively high melting point.

For example, as materials for insulation layers surrounding metal conductors of power cables, conventionally, crosslinked substances of polyolefin-based polymers such as polyethylene, ethylene/propylene elastomeric copolymers (ethylene/propylene rubbers, EPR) and ethylene/propylene/ diene (EPDM) copolymers are generally used.

However, in order to recycle copper (Cu) and aluminum (Al), which are conductors of cables which occupy most of production cost, it is necessary to remove insulation layers that fail to satisfy requirements after production of cables or insulation layers of used cables. However, crosslinked polyethylene (crosslinked PE: XLPE) used as an insulation layer is removed by incineration upon disposal of used cables because reforming (remolding) of XLPE is impossible. At this time, a great amount of $CO_2$ is generated and the burned ash should be buried in a landfill, which causes an environmental problem. In addition, so as to produce XLPE cables, a crosslinkage process at high temperature and at high pressure (for example, about 300° C., 7 atm or the like) is required after cable forming (molding). For this purpose, several tens of meters or more of curing tubes should be introduced, which requires considerable production facility site and power costs. Furthermore, addition of expensive chemical substances (crosslinking agents or the like) is necessary for crosslinkage, which disadvantageously results in increased production costs and waste of resources.

Accordingly, a variety of attempts to solve these problems have been made. For example, Korean Patent Laid-open No. 2014-0134836 suggests use, as an insulation material, of a composition in which propylene copolymer particles are dispersed in polypropylene as a matrix. In accordance with this technology, heat resistance is excellent even without crosslinkage since the polypropylene matrix has a melting point of 150° C. or higher, but a composition having a heterogeneous phase in which a propylene copolymer (rubbery substance) having a predetermined mean weight particle size is dispersed in a polypropylene matrix is used as an insulation material in order to improve insufficient flexibility, bendability and the like, which are drawbacks of polypropylene resins. Products can be manufactured immediately after forming and cooling cables, without an additional crosslinkage process, which causes considerable reduction of production costs and enables all of expensive conductors to be recycled by melting and separating insulation layers that fail to satisfy requirements after production of cables or are disposed, and then forming expensive conductors again. Consequently, it is possible to recycle 100% of the melted and separated PP insulation layer.

As another example, polypropylene is used as a base material for flame retardant substances as well. Flame retardant composites obtained by adding a rubbery polymer to improve flexibility to polypropylene and adding a great amount of inorganic flame retardant agent thereto are used.

Examples of the insulation layer material or flame retardant material have a common feature in that they have a structure in which a rubber-phase substance is dispersed in a polypropylene-based matrix. However, conventionally developed materials have several problems.

Insulation layer materials for power cables provide desired levels of flexibility and bendability through a heterogeneous-phase morphology using the incompatible principle between the polypropylene matrix and propylene copolymer particles, but have problems in that propylene copolymer particles substantially have a heterogeneous phase in the polypropylene matrix, the interfacial separation between propylene copolymer particles and the polypropylene matrix occurs upon bending of power cables or application of external mechanical stress and tension, which causes formation of micro-voids and thus a phenomenon, called "stress whitening (blush)", in which whitening is visible by the naked eye. This results in problems of deterioration in electric and mechanical properties (see: "Comparison of Electrical Treeing in Polypropylene And Crosslinked Polyethylene"—Jorunn Hoito Erling Ildstad/ Norweigian University of Science and Technology: research relating to tests showing that micro-voids cause electrical treeing, and deterioration in electric and mechanical properties).

In addition, regarding flame retardant materials, a predetermined level or more of flame retardancy is dependent upon the content of substantially added flame retardant agent. There is a technological limitation on increasing the amount of flame retardant agent added to materials containing a combination of polypropylene and a rubber-phase substance. Even though a great amount of flame retardant agent can be added, there is a problem of difficulty in maintaining general mechanical properties required for flame retardant materials. Accordingly, there is an increasing need for development of technologies that can solve these problems associated with the composition in which a rubber-phase substance is dispersed in a polypropylene-based matrix.

DISCLOSURE

Technical Problem

Therefore, the present invention has been made to solve the above and other technical problems that have yet to be resolved.

As described later, the present invention is completed based on the finding that the polymer composition according to the present invention has a morphology in which a rubber-phase filler of a propylene copolymer dispersed in a matrix of polypropylene forms a semi-homogeneous or semi-heterogeneous phase with the matrix, so that the polymer composition can exert excellent flexibility and bendability upon bending of materials or application of external mechanical stress and tension, due to superior miscibility between the matrix and the rubber-phase filler, and can considerably reduce a whitening phenomenon and maximize the amount of an inorganic ingredient (such as a flame retardant agent) added.

Technical Solution

In accordance with one aspect of the present invention, provided is a polymer composition having a morphology in which a rubber-phase filler of a propylene copolymer is dispersed in a matrix of polypropylene, wherein an elution rate of the rubber-phase filler in a xylene-based solvent is less than 50%, based on the content of the rubber-phase filler such that the rubber-phase filler forms a semi-homogeneous phase with the matrix.

The semi-homogeneous phase is a new morphology that could not be seen in conventional polymer compositions. In conventional polymer compositions including a matrix and a rubber-phase filler, the rubber-phase filler is present as a substantially heterogeneous phase to the matrix. This can also be seen by an elution test using xylene-based solvents for the rubber-phase filler.

Specifically, when a polymer composition in which a rubber-phase filler of propylene copolymer is dispersed in a matrix of polypropylene is etched in a xylene-based solvent for a predetermined period of time, the rubber-phase filler is eluted by the solvent. At this time, as compared to the rubber-phase filler before the elution test, at least 90% of the rubber-phase filler is eluted. This indicates that the rubber-phase filler is substantially present as a heterogeneous phase to the matrix.

On the other hand, in this elution test for the polymer composition of the present invention, the elution rate of the rubber-phase filler is low, that is, less than 50%. This indicates that the rubber-phase filler exhibits high miscibility with the matrix, which has a novel morphology which could not be seen in conventional technologies. This morphology may be defined as a "semi-homogeneous phase". In some cases, "semi-homogeneous phase" may be also used interchangeably with a "semi-heterogeneous phase".

Effects of the Invention

As described above, the polymer composition according to the present invention has a morphology in which a rubber-phase filler of a propylene copolymer dispersed in a polypropylene matrix forms a semi-homogeneous phase with the matrix, thereby exerting excellent flexibility and bendability, and considerably reducing a whitening phenomenon. Accordingly, when the polymer composition is used as an electrical insulation material, it can provide considerably excellent long-term heat resistance, electrical properties and mechanical properties. In addition, due to high compatibility between the polypropylene matrix and the rubber-phase filler, the amount of inorganic additive added can be considerably increased. For example, when the composition is used as a flame retardant material, it is possible to provide excellent flame retardancy by adding a great amount of flame retardant agent, and to prevent deterioration in mechanical and physical properties due to the high amount of flame retardant agent and thereby to sufficiently maintain general mechanical and physical properties of the flame retardant material.

BRIEF DESCRIPTION OF THE DRAWINGS

The above and other objects, features and other advantages of the present invention will be more clearly understood from the following detailed description taken in conjunction with the accompanying drawings, in which:

FIG. 1 is an SEM image showing results of an elution test of Example 1;

FIG. 2 is an SEM image showing results of an elution test of Example 2;

FIG. 3 is an SEM image showing results of an elution test of Example 3;

FIG. 4 is an SEM image showing results of an elution test of Comparative Example 1;

FIG. 5 is an SEM image showing results of an elution test of Comparative Example 2;

FIG. 6 is an image showing results of a whitening test based on 180-degree folding of Example 1;

FIG. 7 is an image showing results of a whitening test based on 180-degree folding of Example 2;

FIG. 8 is an image showing results of a whitening test based on 180-degree folding of Example 3;

FIG. 9 is an image showing results of a whitening test based on 180-degree folding of Comparative Example 1; and FIG. 10 is an image showing results of a whitening test based on 180-degree folding of Comparative Example 2.

BEST MODE

In the polymer composition of the present invention, the propylene copolymer constituting a rubber-phase filler may be a copolymer of one or more monomers selected from the group consisting of ethylene and $C_4$ to $C_8$ α-olefin, and a propylene monomer. Preferably, the propylene copolymer may be an ethylene-propylene rubber (EPR), a propylene-butene rubber or the like. In some cases, this copolymer may further include a diene unit and such a copolymer may, for example, be an ethylene-propylene diene monomer (EPDM) rubber. When propylene is copolymerized with ethylene, rigidity and flexibility can be obtained and as a result, impact resistance can be further improved.

In the polymer composition of the present invention, the polypropylene constituting a matrix may be, for example, homo-polypropylene, which is a single polymer of propylene, or in some cases, be a polymer based on a combined monomer further including other monomer, in addition to propylene. The matrix of polypropylene provides rigidity and tensile strength. Meanwhile, when the polymer of the polypropylene matrix is a copolymer prepared from a combined monomer including other monomer in addition to propylene, it may include a small amount of a monomer selected from ethylene and $C_4$ to $C_8$ α-olefin, for example, 1-butene, 1-pentene, 4-methyl-1-pentene, 1-hexene, 1-octene and a combination thereof.

Under the condition that the scope of the present invention is not interpreted limitedly, in one aspect, the semi-homogeneous phase in the polymer composition of the present invention may relate to improvement of compatibility between the matrix and the rubber-phase filler by an additive for providing compatibility.

Accordingly, in a specific embodiment, the polymer composition of the present invention may include polypropylene constituting a matrix, a propylene copolymer constituting a rubber-phase filler, a compatibilizer and an initiator for initiating a reaction therebetween.

Specifically, the polymer composition may include a compatibilizer that is bonded to some molecular chains of polypropylene and/or a propylene copolymer by a reaction to modify compatibility of the polypropylene and/or the propylene copolymer, and an initiator to induce the reaction.

For example, regarding this reaction, when polypropylene and/or the propylene copolymer, the compatibilizer and the initiator are subjected to extrusion in an extrusion machine at a high temperature and a high pressure, the initiator enables the compatibilizer to be graft-bonded to the polypropylene and/or propylene copolymer, which can contribute to compatibility therebetween.

At this time, when the polypropylene and propylene copolymer are coated with, for example, a solution of the initiator dissolved in a solvent such as acetone, the compatibilization reaction can be more effectively initiated. In addition, in order to improve the performance of initiator, an initiator aid such as acetic acid may be further used.

For example, the compatibilizer may be one or a mixture of at least two selected from the group consisting of: acrylic acid, fumaric acid, methacrylic acid, crotonic acid, maleic acid, itaconic acid, sorbic acid and anhydrides thereof; and vinyltrimethoxysilane, vinyl-tris(beta-methoxyethoxy)silane, vinyltriacetoxysilane, vinyltrismethoxyethoxysilane, gamma-(meth)acryloxypropytriethoxysilane, vinyltriethoxysilane, and gamma-(meth)acryloxypropyltrimethoxysilane.

The initiator may, for example, be one or a mixture of at least two selected from the group consisting of hydroperoxide-based, ketone peroxide-based, acyl peroxide-based, dialkyl- or dialkyl peroxide-based, peroxy ester-based and azo compound-based initiators. Specifically, the initiator may be, for example, one or a mixture of at least two selected from the group consisting of tert-butyl hydroperoxide, p-methane hydroperoxide, cumene hydroxide, cyclohexanone peroxide, methylethyl ketone peroxide, benzoyl peroxide, di-tert-butyl peroxide, dicumyl peroxide, cumyl-butyl peroxide, 1,1-di-tert-butylperoxy-3,5,5-trimethylcyclohexane, 2,5-dimethyl-2,5-2,5-di-tert-butylperoxy isopropylbenzene, tert-butyl peroxypivalate, tert-butyl di(perphthalate)dialkyl peroxymonocarbonate, and peroxydicarbonate azobis isobutyronitrile.

The compatibilizer is present in the polymer composition in an amount within the range, enabling these ingredients to exert desired functions, particularly, 0.01 to 4 parts by weight, more particularly 0.02 to 2 parts by weight, even more particularly 0.03 to 1.0 part by weight, based on 100 parts by weight of polypropylene.

The initiator is used in a catalytic amount. Thus, its content may be 2 parts by weight or less, particularly 1 part by weight or less, based on 100 parts by weight of polypropylene.

Under the condition that the scope of the present invention is not interpreted limitedly, in another aspect, the semi-homogeneous phase in the polymer composition of the present invention is believed to closely relate to the content of propylene in the propylene copolymer constituting the rubber-phase filler. In general conventional technologies, the content of propylene is set to 80% or less in the propylene copolymer. For example, Korean Patent Laid-open No. 10-2014-0134836 described above discloses that, when the propylene content is higher than 80%, flexibility, bendability, impact resistance, cold resistance or the like of the insulation layer may be insufficient.

On the other hand, the present invention has a distinguishing configuration in which propylene is present in a higher content in the propylene copolymer and rubber-phase particles have a semi-homogeneous phase morphology to the matrix, thereby exerting sufficient flexibility and bendability and significantly reducing a whitening phenomenon, as compared to conventional polymer compositions. As a result, when the composition of present invention is used, for example, as a material for an insulation layer, long-term heat resistance, electrical properties and mechanical properties can be improved proportionally.

Accordingly, in a specific embodiment, the content of propylene in the propylene copolymer is higher than 84% and lower than 92%, on a weight basis.

Specifically, when the propylene content is 84% or less, the rubber-phase filler may not form a semi-homogeneous phase, which may cause deterioration in electrical properties due to the whitening phenomenon or the like as described above.

On the other hand, when the propylene content is 92% or more, stiffness may occur due to excessively high propylene content. Specifically, a region where the propylene content is 95% or more, corresponds to a region of random polypropylene and becomes a homogeneous phase morphology, in particular, low-temperature impact resistance such as cold resistance may be deteriorated due to deterioration in flexibility and flexural strength.

Preferably, the propylene content is 86% to 91%, more preferably 88% to 91%.

An elution rate of the rubber-phase filler in the xylene-based solvent is lower than 50%, as described above. When the elution rate is higher than the level, it may be difficult for the rubber-phase particles to form substantially a semi-homogeneous phase with the matrix. Preferably, the elution rate is 5% to 40%, more preferably 7% to 30%. An elution rate of 0% means that the rubber-phase filler is not substantially eluted in the xylene-based solvent. When the elution rate is excessively low, disadvantageously, it may be difficult for the rubber-phase filler to sufficiently exert properties thereof due to excessively high miscibility of the rubber-phase filler with the polypropylene matrix.

Examples of the xylene-based solvent include xylene, heptane and the like, but are not particularly limited thereto, and the representative example thereof may be xylene.

The elution rate of the rubber-phase filler is determined by impregnating the polymer composition at a temperature of 10° C. to 80° C. for 0.3 to 24 hours, specifically, at room temperature to a temperature of 60° C. for 0.5 to 12 hours, removing the solvent, and then comparatively measuring a ratio of a volume of the rubber-phase filler after an elution test to a volume of the rubber-phase filler before the elution test. In some cases, during or after impregnation, sonication may be further conducted.

In order to calculate the elution rate, for example, an atomic force microscope (AFM), a scanning electron microscope (SEM), a transmission electron microscope (TEM) or the like may be used, and an example of volumic measurement based on it can be seen from related documents. Related methods are disclosed in the document [Poelt et al. J. Appl. Polym. Sci. 78 (2000) 1152-61], which is incorporated herein by reference in its entirety.

In a specific embodiment, the propylene copolymer particles may have a mean particle diameter ranging from 0.001 to 0.1 μm.

Under the condition that the scope of the present invention is not interpreted limitedly, the mean particle diameter of propylene copolymer particles may relate to the semi-homogeneous phase morphology described above.

Specifically, when propylene copolymer particles having a mean particle diameter smaller than 0.1 μm are incorporated, it is possible to provide an electrical insulation polymer composition that has excellent impact strength and dielectric strength, and can maintain the dielectric strength even upon variation in temperature or pressure.

Particularly, a polymer composition including a polypropylene matrix in which a propylene copolymer having a mean particle diameter of 0.001 to 0.1 μm is dispersed can provide excellent AC dielectric strength characteristics even at high temperature, superior long-term heat resistance and better electrical insulation property than conventional polymer compositions, and maintain the constant AC dielectric strength characteristics even upon pressure variation. Accordingly, it is possible to provide, as an eco-friendly insulation material, an eco-friendly polymer composition for an insulation layer of power cables that can be widely used for high-voltage power cables, instead of crosslinked polyethylene (XLPE).

In a preferred embodiment, propylene copolymer particles may have a mean particle diameter of 0.005 to 0.1 μm.

In a specific embodiment, the rubber-phase filler may be present in an amount of 15 to 80% by weight, based on the total weight of the polymer composition. When the content of the rubber-phase filler is lower than 15% by weight, flexibility, bendability, impact resistance, cold resistance and the like of the formed material may be insufficient. More preferably, the content of the rubber-phase filler is 30 to 75% by weight.

For reference, in order to evaluate excellent electrical properties of the polymer composition according to the present invention, AC dielectric breakdown voltage is measured and, so as to analyze AC dielectric breakdown characteristics, electric field distribution is analyzed depending on type of sample disposed between respective electrodes through simulation using an FEM (finite element method) analysis tool.

The polymer composition having a semi-homogeneous phase according to the present invention including a matrix of polypropylene, a rubber-phase filler of a propylene copolymer and the like is preferably used as an insulation layer for power cables.

The polymer composition may be present in the insulation layer for power cables in an amount of 15% by weight or more, preferably, 25% by weight or more, more preferably 30% by weight or more, based on the total weight of the insulation layer for power cables.

In some cases, the insulation layer for power cables may further include other polymer, in addition to the polymer composition. In a specific embodiment, the other polymer may be a thermoplastic polymer, particularly, polyethylene. The addition of polyethylene may change mechanical properties of cable insulation layers. For example, when impact strength and resistance to ductility or the like needs to be further improved, this can be accomplished by incorporation of suitable polyethylene.

If necessary, the polymer composition may further include one or more other additives selected from the group consisting of an insulation oil, an antioxidant, an impact modifier, a flame retardant agent, a heat stabilizer, a nucleating agent and an acid scavenger.

Further, the polymer composition according to the present invention may also be applied to a flame retardant material. In this case, an inorganic flame retardant agent is added to the polymer composition and the inorganic flame retardant agent may be added in an amount of, for example, 100 parts by weight or more, preferably 120 parts by weight or more, more preferably 150 parts by weight or more, based on 100 parts by weight of polypropylene. The upper limit of the flame retardant agent does not need to be specifically determined, because it can be suitably controlled in consideration of requirements for the field to which the flame retardant material is applied. For example, the upper limit of the flame retardant agent is determined within the range of 200 parts by weight to 400 parts by weight.

When taking into consideration the fact that the content of flame retardant agent in a general polypropylene-based flame retardant material does not exceed 130 parts by weight, the polymer composition according to the present invention can include a considerably high content of flame retardant agent and can maintain excellent flame retardancy and general mechanical properties required for flame retardant materials due to the high content. As such, presence of a high content of the flame retardant agent is believed to be due to high compatibility between the polypropylene matrix and the rubber-phase filler providing a semi-homogeneous phase morphology, as described above.

In a specific embodiment, the inorganic flame retardant agent may, for example, include at least one selected from the group consisting of talc, mica, wollastonite, clay, silica, calcium carbonate and metal hydrate.

Examples of the metal hydrate include aluminum hydroxide, magnesium hydroxide, calcium hydroxide and the like.

In some cases, a polymer composition including a flame retardant agent may further include a polyketone-based resin and/or a polyalkylene carbonate-based resin. The polyketone- and polyalkylene carbonate-based resins may be present in an amount of 5 parts by weight to 50 parts by weight, based on 100 parts by weight of polypropylene.

Upon combustion, the polyketone-based resin rapidly creates char without an aid of other substance and generates CO and $H_2O$, and the polyalkylene carbonate-based resin generates incombustible gasses, i.e., $H_2O$ and $CO_2$, to dilute combustible gasses and oxygen. Accordingly, self-extinguishing property comparable to PVC with excellent flame retardancy can be provided.

In a specific embodiment, the polyketone-based resin may be a linear alternating polymer prepared by polymerization of carbon monoxide and at least one type of olefin-based unsaturated compound as monomers.

Particularly, the olefin-based unsaturated compound may include one or more selected from the group consisting of: α-olefin, for example, ethylene, propylene, 1-butene, 1-hexene, 4-methyl-1-pentene, 1-octene, 1-decene, 1-dodecene, 1-tetradecene, 1-hexadecene, vinylcyclohexane and the like; alkenyl aromatic compounds such as styrene and α-methylstyrene; cyclic olefin such as cyclopentene, norbornene, 5-methylnorbornene, 5-phenylnorbornene, tetracyclododecene, tricyclododecene, tricycloundecene, pentacyclopentadecene, pentacyclohexadecene, 8-ethyltetracyclododecene and the like; halogenated vinyl such as vinyl chloride; and ester acrylate such as ethyl acrylate and methyl acrylate, but is not limited thereto.

More particularly, the olefin-based unsaturated compound may be α-olefin, even more particularly, $C_2$ to $C_4$ α-olefin, most particularly, ethylene.

For example, the polyketone-based resin can be prepared by liquid polymerization of carbon monoxide and an olefin-based compound using an alcohol solvent in the presence of a catalyst containing a palladium compound, an acid having a pKa of 6 or less and a bidentate ligand compound of phosphorus. At this time, the polymerization temperature may be 50 to 100° C. and the reaction pressure may be 40 to 60 bar.

In a specific embodiment, the polyalkylene carbonate-based resin may be a linear alternating polymer obtained by polymerization of carbon dioxide and at least one type of epoxide-based compound as monomers.

Particularly, for example, the epoxide-based compound may include one or more selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, glycidyl methyl ether, glycidyl ethyl ether, glycidyl normal-propyl ether, glycidyl sec-butyl ether, glycidyl normal- or iso-pentyl ether, glycidyl normal-hexyl ether, glycidyl normal-heptyl ether, glycidyl normal-octyl or 2-ethyl-hexyl ether, glycidyl normal- or iso-nonyl ether, glycidyl normal-decyl ether, glycidyl normal-dodecyl ether, glycidyl normal-tetradecyl ether, glycidyl normal-hexadecyl ether, glycidyl normal-octadecyl ether, glycidyl normal eicosyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbornene, limonene oxide, dieldrin, 2,3-epoxidepropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxidepropyl ether, epoxypropyl methoxyphenyl ether biphenyl glycidyl ether, glycidyl naphthyl ether, glycidol acetate ester, glycidyl propionate, glycidyl butanoate, glycidyl normal-pentanoate, glycidyl normal-hexanoate, glycidyl heptanoate, glycidyl normal-octanoate, glycidyl 2-ethylhexanoate, glycidyl normal-nonanoate, glycidyl normal-decanoate, glycidyl normal-dodecanoate, glycidyl normal-tetradecanoate, glycidyl normal-hexadecanoate, glycidyl normal-octadecanoate, and glycidyl eicosanoate, but is not limited thereto.

Such a flame retardant polymer composition may be, for example, prepared by first mixing a polyketone-based resin and/or a polyalkylene carbonate-based resin with a flame retardant agent, and adding a flame retardant agent thereto while mixing the resulting mixture with polypropylene and a propylene copolymer. Through this mixing method, it is possible to maximize the content of flame retardant agent and thus prepare a material having considerably excellent flame retardancy.

BEST MODE

Now, the present invention will be described in more detail with reference to the following examples. These examples are provided only for better understanding of the present invention and should not be construed as limiting the scope of the present invention.

Example 1

A polymer composition including 65 wt % of homo-polypropylene, 35 wt % of a copolymer having a propylene/ethylene ratio (weight ratio) of 89/11, 0.03 parts by weight of vinyltrimethoxysilane as a compatibilizer and 0.0015 parts by weight of dicumyl peroxide as an initiator, based on 100 parts by weight of the homo-polypropylene, 10,000 ppm of a primary antioxidant and 10,000 ppm of a secondary antioxidant was mixed in a 75 mm twin-screw extruder to produce a pellet. At this time, the extrusion temperature was 200° C. to 220° C. for a cylinder, 225° C. for a screen changer, and 230° C. for a die. The pellet thus produced was compression-molded at 220° C. for 4 minutes to produce a sheet with a width of 1 mm.

The sheet was cut to a width of 1 mm and a length of 10 cm, and the propylene/ethylene copolymer was eluted in 60° C. xylene by sonication for 3 hours. This was analyzed by SEM (see FIG. 1).

In addition, an AC dielectric breakdown voltage ($V_{BD, 63.2}$% KV/mm) was analyzed in accordance with ASTM D149 (an international standard for testing dielectric strength characteristics of a solid insulator at a commercial frequency of 60 Hz or 25 to 800 Hz).

In addition, stress was applied by folding the sheet with a thickness of 5 mm, a width of 1 mm and a length of 10 cm at 180 degrees and then whether or not a whitening phenomenon occurred was checked.

In addition, in a PP cable production equipment (extruder diameter of insulation layer/inner semiconductor layer/outer semiconductor layer=150 mm/60 mm/90 mm), a cable of conductor/inner semiconductor layer/insulation layer/outer semiconductor layer=23 mm/0.55 mm/6.8 mm/1.05 mm was produced under insulation layer extrusion temperature conditions of 170° C. to 200° C. for a cylinder, 230° C. for a die, 160° C. to 190° C. for an inner semiconductor layer cylinder, 230° C. for a die, 170° C. to 200° C. for an outer semiconductor layer cylinder and 230° C. for a die and were then coated with a neutral wire and a jacket to produce a 22.9 KV eco-friendly aluminum power cable with a total outer diameter of 52.5 mm and the partial discharge value thereof was then measured.

Example 2

A polymer composition including 65 wt % of homo-polypropylene, 35 wt % of a copolymer having a propylene/ethylene ratio (weight ratio) of 89/11, 10,000 ppm of a primary antioxidant and 10,000 ppm of a secondary antioxidant was prepared under the same extrusion conditions as in Example 1.

SEM analysis was conducted in the same manner as in Example 1 (see FIG. 2) and a cable was produced and analyzed under the same conditions as in Example 1.

Example 3

A polymer composition including 65 wt % of homo-polypropylene, 35 wt % of a copolymer having a propylene/ethylene ratio (weight ratio) of 85/15, 10,000 ppm of a primary antioxidant and 10,000 ppm of a secondary antioxidant was prepared in the same extrusion conditions as in Example 1.

SEM analysis was conducted in the same manner as in Example 1 (see FIG. 3) and a cable was produced and analyzed under the same conditions as in Example 1.

Example 4

A polymer composition including 25 wt % of homo-polypropylene, 75 wt % of a copolymer having a propylene/ethylene ratio (weight ratio) of 89/11, 0.03 parts by weight of vinyltrimethoxysilane as a compatibilizer, 0.0015 parts by weight of dicumyl peroxide as an initiator, 100 parts by weight of magnesium hydroxide and 50 parts by weight of hydromagnesite as an inorganic flame retardant agent and 4 parts by weight of a siloxane polymer as a processing aid, based on 100 parts by weight of homo-polypropylene, was mixed in a 75 mm twin-screw extruder under the following temperature conditions (cylinder: 170 to 195° C., die: 190° C.) to produce a pellet.

An injection sample was produced from the pellet thus produced at an injection temperature of 220° C., and tensile strength and elongation thereof were thus measured.

In addition, certified flame retardancy test was conducted for flame retardancy analysis.

Comparative Example 1

A polymer composition including 65 wt % of homo-polypropylene, 35 wt % of a copolymer having a propylene/ethylene ratio (weight ratio) of 50/50, 10,000 ppm of a primary antioxidant and 10,000 ppm of a secondary antioxidant was extruded in the same extrusion conditions as in Example 1.

SEM analysis was conducted in the same manner as in Example 1 (see FIG. 4) and a cable was produced and analyzed under the same conditions as in Example 1.

Comparative Example 2

A polymer composition including 65 wt % of homo-polypropylene, 35 wt % of a copolymer having a propylene/ethylene ratio (weight ratio) of 60/40, 10,000 ppm of a primary antioxidant and 10,000 ppm of a secondary antioxidant was extruded in the same extrusion conditions as in Example 1.

SEM analysis was conducted in the same manner as in Example 1 (see FIG. 5) and a cable was produced and analyzed under the same conditions as in Example 1.

Comparative Example 3

A polymer composition including 25 wt % of homo-polypropylene, 75 wt % of a copolymer having a propylene/ethylene ratio (weight ratio) of 50/50, and 70 parts by weight of magnesium hydroxide and 30 parts by weight of aluminum hydroxide as inorganic flame retardant agents, and 6 parts by weight of a siloxane polymer as a processing aid, based on 100 parts by weight of homo-polypropylene, was prepared in a 75 mm twin-screw extruder.

Subsequently, analysis was conducted in the same manner as in Example 4.

Test results are shown in the following Tables 1 and 2.

TABLE 1

| | Example 1 | Example 2 | Example 3 | Comparative Example 1 | Comparative Example 2 |
|---|---|---|---|---|---|
| Xylene elution rate (%) | 10 | 20 | 25 | 90> | 90> |
| | FIG. 1 | FIG. 2 | FIG. 3 | FIG. 4 | FIG. 5 |
| AC dielectric breakdown voltage ($V_{BD,\ 63.2\%}$ kV/mm) | 142 | 144 | 137 | 108 | |
| Whitening phenomenon | FIG. 6 | FIG. 7 | FIG. 8 | FIG. 9 | FIG. 10 |
| Partial discharge (picocoulomb, pc) | 1.1 | 2.3 | 3.5 | 9.2 | 8.3 |
| Tensile strength (kg/mm$^2$) | 31.37 | 31.38 | 32.02 | 31.34 | 30.98 |
| Elongation (%) | 815.04 | 805.32 | 803.20 | 805.66 | 809.43 |

TABLE 2

| | | Example 4 | Comparative Example 3 |
|---|---|---|---|
| Tensile strength (kg/mm$^2$) | | 12 | 4.5 |
| Elongation (%) | | 230 | 35 |
| After-flame time (UL94-V) | $T_1$ | ≤2 sec | ≥10 sec |
| | $T_2$ | ≤5 sec | ≥20 sec |
| Total after-flame time (UL94-V) | $T_2 + T_3$ | ≤5 sec | ≥60 sec |
| Combustion to 125 mm marker line (UL94-V) | | No | No |
| Combustion of cotton by dropped object (UL94-V) | | No | Yes |

As can be seen from the tables above, Comparative Examples 1 and 2 had xylene elution rates exceeding 90%, while all of Examples 1 to 3 had xylene elution rates of less than 50% and thus exhibited much better electrical properties than Comparative Examples 1 and 2. Examples 1 to 3 (FIGS. 6 to 8) exhibited much better whitening phenomenon characteristics than Comparative Examples 1 and 2 (FIGS. 9 and 10). In particular, it can be seen that Example 1 was the best in terms of all properties.

Regarding flame retardancy, it can be seen from test results shown in Table 2 that the polymer composition of Example 4 exhibits excellent mechanical properties as well as considerably better flame retardant properties, as compared to Comparative Example 3.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polymer composition having a morphology in which a rubber-phase filler of a propylene copolymer is dispersed in a matrix of polypropylene,
    wherein an elution rate of the rubber-phase filler in a xylene-based solvent is less than 50%, based on the content of the rubber-phase filler such that the rubber-phase filler forms a semi-homogeneous phase with the matrix,
    wherein the polymer composition includes a compatibilizer that is bonded to some molecular chains of polypropylene and/or a propylene copolymer by a reaction to modify compatibility of the polypropylene and/or the propylene copolymer, and an initiator to induce the reaction,
    wherein a content of propylene in the propylene copolymer is higher than 84% by weight and lower than 92% by weight, and wherein the rubber-phase filler has a mean particle diameter of 0.001 to 0.1 μm.

2. The polymer composition according to claim 1, wherein the propylene copolymer is a copolymer of one or more monomers selected from the group consisting of ethylene and $C_4$ to $C_8$ α-olefin, and a propylene monomer.

3. The polymer composition according to claim 1, wherein the propylene copolymer is an ethylene-propylene rubber (EPR), a propylene-butene rubber or an ethylene-propylene diene monomer (EPDM) rubber.

4. The polymer composition according to claim 1, wherein the compatibilizer comprises one or a mixture of at least two selected from the group consisting of: acrylic acid, fumaric acid, methacrylic acid, crotonic acid, maleic acid, itaconic acid, sorbic acid and anhydrides thereof; and vinyl-trimethoxysilane, vinyl-tri s(beta-methoxyethoxy)silane, vinyltriacetoxysilane, vinyltri smethoxyethoxysilane, gamma-(meth)acryloxypropyltriethoxysilane, vinyltriethoxysilane, and gamma-(meth)acryloxypropyltrimethoxysilane, and the initiator comprises one or a mixture of at least two selected from the group consisting of hydroperoxide-based, ketone peroxide-based, acyl peroxide-based, dialkyl- or dialkyl peroxide-based, peroxy ester-based and azo compound-based initiators.

5. The polymer composition according to claim 1, wherein a content of propylene in the propylene copolymer is 86% by weight to 91% by weight.

6. The polymer composition according to claim 1, wherein a content of the rubber-phase filler is 15 to 80% by weight, based on the total weight of the polymer composition.

7. The polymer composition according to claim 1, further comprising 150 parts by weight or more of an inorganic flame retardant agent, based on 100 parts by weight of the polypropylene.

* * * * *